US010615600B1

(12) United States Patent
Steciuk et al.

(10) Patent No.: US 10,615,600 B1
(45) Date of Patent: Apr. 7, 2020

(54) REACTIVE POWER SYSTEM IN COMMUNICATION WITH MOTOR STARTER SYSTEM

(71) Applicant: Northeast Power Systems, Inc., Queensbury, NY (US)

(72) Inventors: Paul B. Steciuk, Saratoga, NY (US); Frank J. Steciuk, Queensbury, NY (US); Peter A. Steciuk, Lake George, NY (US)

(73) Assignee: Northeast Power Systems, Inc., Queensbury, NY (US)

( * ) Notice: Subject to any disclaimer, the term of this patent is extended or adjusted under 35 U.S.C. 154(b) by 0 days.

(21) Appl. No.: 16/244,764

(22) Filed: Jan. 10, 2019

(51) Int. Cl.
*G05F 1/652* (2006.01)
*H02J 3/18* (2006.01)
*G05F 1/573* (2006.01)
*G05F 1/56* (2006.01)
*H02P 1/44* (2006.01)

(52) U.S. Cl.
CPC ............ *H02J 3/1892* (2013.01); *G05F 1/562* (2013.01); *G05F 1/573* (2013.01); *H02J 3/1828* (2013.01); *G05F 1/652* (2013.01); *H02P 1/445* (2013.01)

(58) Field of Classification Search
CPC ...... H02J 3/1842; H02J 3/1892; H02J 3/1828; H02P 1/445; G05F 1/652
See application file for complete search history.

(56) References Cited

U.S. PATENT DOCUMENTS 5,387,821 A     2/1995 Steciuk et al.
6,424,821 B1 *  7/2002 Komai ............... B23Q 11/00
                                                455/66.1
(Continued)

FOREIGN PATENT DOCUMENTS

CN    108448947 A  *  8/2018
DE      3331307 A  *  3/1985   ............. H02P 1/26
JP     57028579 A  *  2/1982   ............. H02P 1/26

OTHER PUBLICATIONS

Machine Translation of CN108448947A, Aug. 2018, 5 pages.*
Machine Translation of JP 57028579, Feb. 1982, 4 pages.*
Machine Translation of DE3331307, Mar. 1985, 6 pages.*

*Primary Examiner* — Harry R Behm
(74) *Attorney, Agent, or Firm* — Condo Roccia Koptiw LLP

(57) ABSTRACT

A reactive power system comprises a plurality of electrical capacitor banks, with each electrical capacitor bank electrically connected in series with an electrical switch. The electrical switches may be electrically connected to a system such as, for example, an electrical induction motor starter system. A controller is coupled with the motor starter system and each of the electrical switches. The controller, in response to receiving a signal from the motor starter system, determines which of the plurality of electrical capacitor banks from which electrical power should be provided for the motor starter system. For the determined or identified electrical capacitor bank(s), the controller identifies the corresponding electrical switch(es) and communicates a signal to close the switch(es). Closing the switches results in the capacitors in the corresponding electrical capacitor banks to be electrically connected to the motor starter system and to provide current to the motor starter system.

14 Claims, 4 Drawing Sheets

(56) References Cited

U.S. PATENT DOCUMENTS

| | | | |
|---|---|---|---|
| 2008/0278108 A1* | 11/2008 | Choi | H02K 21/46 318/715 |
| 2011/0141637 A1* | 6/2011 | Klodowski | H02J 3/386 361/56 |
| 2012/0250752 A1* | 10/2012 | McHann, Jr. | H02J 13/002 375/228 |
| 2015/0042260 A1* | 2/2015 | Sturm | H02P 25/04 318/729 |
| 2015/0177306 A1* | 6/2015 | Hedlund | G01R 31/028 324/548 |
| 2017/0350942 A1* | 12/2017 | Kinsella | G01R 31/3277 |

* cited by examiner

REACTIVE POWER SYSTEM IN COMMUNICATION WITH MOTOR STARTER SYSTEM

BACKGROUND

In electrical systems, devices such as inductors may draw electric current and cause a voltage drop but may not actually dissipate power. By drawing current and causing a voltage drop, these devices may give the appearance that they dissipate power. The power that devices appear to dissipate may be referred to as reactive power, while the actual power dissipated in a circuit may be referred to as the true power. The total power used by a circuit is the sum of the true power dissipated and the reactive power.

Electric motors, because they are inductive devices that draw current and cause a voltage drop, are sometimes the cause of reactive power in a power distribution system. For electrical induction motors used in large industrial applications, the current drawn during startup of the motor, referred to as inrush current, can be significant, and may result in a correspondingly large voltage drop, which may be referred to as voltage sag, appearing to the power supplying system. Such large voltage drops can negatively impact the operation of the power supply grid as well as other systems connected to the power grid. Large increases in the demand for reactive power may negatively impact the power quality in the distribution grid and/or result in other customers experiencing a significant drop in electrical current. To avoid the negative impact resulting from large and sudden demands for reactive power, some power generating organizations impose requirements to minimize or limit the reactive power demanded by customer systems.

SUMMARY

Applicant discloses systems for providing reactive power. The disclosed systems may be employed to fulfill temporary demands for power from electrical systems. The systems may be employed, for example, to provide power during startup of electrical induction motor systems. An example system may comprise a plurality of stages, with each stage comprising an electrical switch and one or more capacitors. For example, a first stage may comprise a first electrical contact adapted to interface with a power bus, a first electrical switch electrically connected with the first electrical contact, and a first electrical capacitor electrically coupled in series with the a first electrical switch. The first electrical capacitor may conduct electric current through the first switch to the first electric contact upon the first electrical switch being closed.

A second stage may comprise a second electrical contact adapted to interface with the power bus, a second electrical switch electrically connected with the second electrical contact, and a second electrical capacitor electrically coupled in series with the second electrical switch. The second electrical capacitor may conduct electric current through the second switch to the second electrical contact upon the second electrical switch being closed.

A third stage may comprise a third electrical contact adapted to interface with the power bus, a third electrical switch electrically connected with the third electrical contact, and a third electrical capacitor electrically coupled in series with the third electrical switch. The third electrical capacitor may conduct electric current through the third switch to the third electrical contact upon the first electrical switch being closed.

A controller may be communicatively coupled to the first electrical switch, the second electrical switch, and the third electrical switch. The controller may be programmed to receive an input from a system such as, for example, a motor starter system, that is electrically coupled to the power bus. The controller may select, based on the motor starter system from which the input was received, to close one or more of first electrical switch, the second electrical switch, and the third electrical switch. For example, the controller may determine for the motor starter system from which the input was received, which of the first, second, and/or third capacitors should be connected to provide power to the motor starter system. For instance, the controller may determine for a motor starter system, due to the size of the motor starter system and the electric current likely drawn in operating the motor starter system, the first, second, and third capacitors should be used to provide power. For another motor starter system, the controller may determine that power is needed from only the first and second capacitors, but not the third.

The controller may be programmed to communicate one or more signals or commands to the switches corresponding to the selected one or more of the first capacitor, second capacitor, and third capacitor. For example, where the controller determined to provide current from each of the first, second, and third capacitors, the controller may communicate signals to each of the corresponding first, second, and third switches. At each switch that receives one or more signals, the switch may close, creating an electric circuit to the power bus via which electric current may flow from the corresponding connected electrical capacitor. The current flows from the capacitor, through the switch, and to the corresponding electrical contact with the power bus. Current flows through the power bus to the electrical system that requires power, which may be, for example, a motor starter system. The current provided by the system may be sufficient to satisfy a temporary need.

The electrical switches may be programmed to generate and communicate to the controller a confirming signal that the switch has closed. The electrical system that is being served by the current, which may be, for example, a motor starter system, may similarly be programmed to send to the controller a signal confirming starting of the system.

The controller may be programmed to monitor for receipt of confirming signals from the switches and the motor starter system. The controller may be programmed to determine if a signal confirming closure is received from the selected one or more of the first electrical switch, the second electrical switch, and the third electrical switch. The controller may likewise be programmed to receive a confirmation signal from the motor starter system. The controller may be programmed to determine if the confirmation signals are received within a prescribed period from issuing of the signal to close.

A failure to receive confirming signals within a prescribed period may be an indication that there has been a possible malfunction in the operation of the system. The controller may be programmed, upon determining that confirmation has not been received within a defined time from the motor starter system and the selected one or more of the first electrical switch, the second electrical switch, and the third electrical switch, to communicate one or more signals to the motor starter system to cease startup, and to communicate one or more signals to the first electrical switch, the second electrical switch, and the third electrical switch to open.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features are described below.

BRIEF DESCRIPTION OF DRAWINGS

The following description of the illustrative embodiments may be better understood when read in conjunction with the appended drawings. It is understood that potential embodiments of the disclosed systems and methods are not limited to those depicted.

DETAILED DESCRIPTION

Applicant discloses a system adapted to satisfy needs for reactive power. For example, the disclosed system may be employed to provide power during startup of an induction motor starter system. An example system may comprise a plurality of electrical capacitor banks, with each electrical capacitor bank electrically connected in series with an electrical switch. The electrical switches may be electrically connected to a system such as, for example, an electrical induction motor starter system. The system may comprise a controller communicatively coupled with the electrical induction motor starter system and each of the electrical switches. The controller, in response to receiving a signal or communication from the electrical induction motor starter system, determines which of the plurality of electrical capacitor banks from which electrical power should be provided for the electrical induction motor starter system. For the determined or identified electrical capacitor bank(s), the controller identifies the corresponding electrical switch(es) and communicates a signal to close the switch(es). Closing the switches results in the capacitors in the corresponding electrical capacitor banks to be electrically connected to the electrical induction motor starter system and to provide current to the electrical induction motor starter system.

Figure 1:
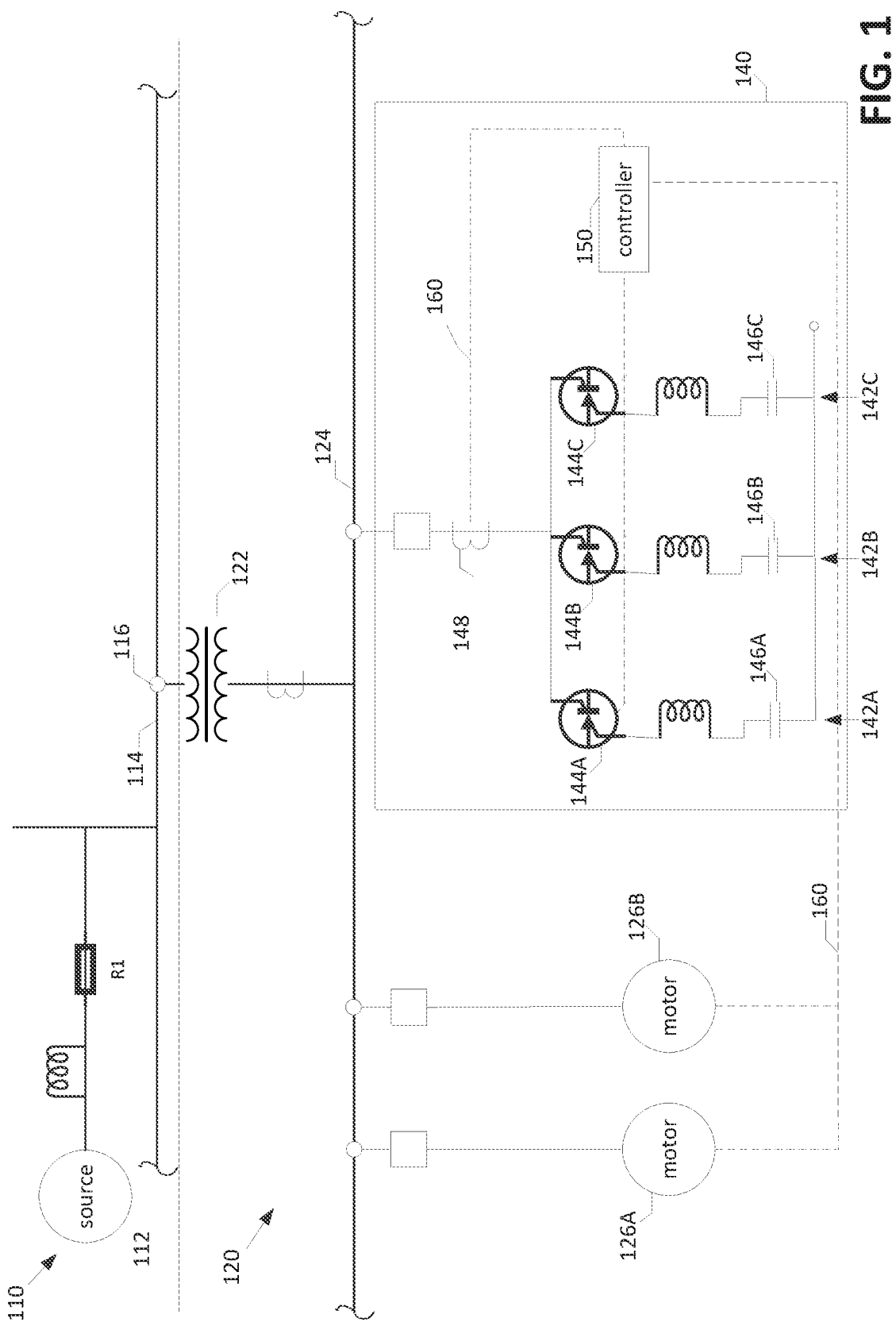
FIG. 1 depicts an example source power distribution system and an example system adapted to provide reactive power.

FIG. 1 depicts power distribution system 110 electrically coupled to a user system 120. As shown, power distribution system 110 may comprise power source 112 which is adapted to provide power to power transmission line 114. Power source 112 may be any suitable source of power source such as, for example, a power generating system. Power transmission line 114 may comprise electrical inductance and resistive devices and carries electricity from power source 112 to common coupling 116. User system 120 is electrically coupled to common coupling 116 and receives electricity communicated from power source 112. It will be appreciated that while power transmission line 114 is illustrated using a single line, any suitable number of physical lines may be employed. For example, power may be transmitted in multiple phases, in which instance, power transmission line 114 may comprise a plurality of lines for transmitting different power phases.

In an example, user system 120 may comprise voltage transformer 122 which is adapted to step down the voltage of the electricity received at common coupling 116 to a voltage suitable for use by devices in user system 120. The stepped down voltage may be communicated within user system 120 using power bus 124. While power transmission bus 124 is illustrated using a single line, it will be appreciated that the power may be transmitted in multiple, e.g., three, phases, in which instance, power bus 124 may comprise a plurality of lines for transmitting different power phases.

User system 120 may comprise electrical equipment that uses electrical power provided by power distribution system 110. In the example of FIG. 1, user system 120 comprises electrical induction motor starter systems 126A and 126B. Electrical induction motor starter systems 126A and 126B may comprise motors and equipment for starting and operating the motors. For example, electrical induction motor starter systems 126A and 126B may comprise motor starters adapted to bring a motor to operating speed.

Some types of electrical equipment may draw significant current at various times during operation. For example, electric induction motors during starting may draw significant current during startup. Reactive power system 140 is electrically coupled with motor starter systems 126A and 126B via power bus 124 to provide added current into motor starter systems 126A and 126B during startup and thereby lessen or eliminate voltage sag at common coupling 116 and also on power bus 124 providing improved power quality to other electrical equipment on the user system 120.

As shown in FIG. 1, example reactive power system 140 is electrically connected to motor starter systems 126A and 126B via power bus 124. Reactive power system 140 may comprise a plurality of stages 142A, 142B, and 142C. In the example illustrated in FIG. 1, reactive power system 140 comprises three stages 142A, 142B, and 142C, although any suitable number of stages may be employed. Each stage is adapted to provide reactive power as determined by and signaled by controller 150 during startup of motor starter systems 126A and 126B.

Each of stages 142A, 142B, and 142C comprises an electrical switch 144A, 144B, and 144C, respectively, placed in series with respective capacitor banks 146A, 146B, and 146C. When a switch such as, for example, switch 144A is open, the corresponding capacitor bank 146A is electrically isolated from power bus 124 and motor starter systems 126A and 126B. When switch 144A is closed, the corresponding capacitor bank 146A is electrically connected to power bus 124 and, thereby, to a selected one of motor starter systems 126A and 126B. When connected through switch 142A to power bus 124, capacitor bank 146A is electrically connected to bus 124 and provides reactive power to a designated one of motor starter systems 126A or 126B via bus 124. Each of capacitor banks 146A, 146B, and 146C may comprise any suitable number of electrical capacitors and may be sized to provide adequate reactive power to motor starter systems 126A and 126B during startup.

Controller 150 may be a programmable device with computing memory and logic and may be programmed to determine which of capacitor banks 146A, 146B, and/or 146C should be applied to provide reactive power during startup of a particular one of motor starter systems 126A and 126B. Controller 150 is communicatively coupled with each of electrical switches 144A, 144B, and 144C via communication line 160. Controller 150 is likewise communicatively coupled to motor starter systems 126A and 126B and with current transformer 148, which is adapted to measure the alternating current at the electrical junction of reactive power system 140 with power bus 124. Any suitable communication technologies may be employed to couple devices 126A, 126B, 144A, 144B, 144C, and 148 with controller 150 via communications network 160.

Controller 150 may be programmed to receive inputs indicating one of motor starter systems 126A and 126B is to be started. For example, controller 150 may receive a signal over communication network 160 from one of motor starter systems 126A and 126B indicating the particular system is to be started.

Upon receiving a signal indicating one of motor systems 126A and 126B is to start, controller 150 determines which of capacitor banks 146A, 146B, and/or 146C should be applied to providing reactive power for starting the motor system. For example, controller 150 may have previously been programmed to select capacitor banks 146A, 146B, and 146C to be applied when motor system 126A is being started. Or by way of further example, controller may have previously been programmed to select capacitor banks 146B and 146C to be applied when motor starter system 126B is being started. The number and types of capacitor banks selected for a motor starter system may depend upon the amount of reactive power anticipated to be used in starting a particular motor system. Controller 150 determines the switches (144A, 144B, and/or 144C) that correspond to the identified capacitor banks (146A, 146B, and/or 146C). For example, in a scenario wherein controller 150 determines each of capacitor banks 146A, 146B, and 146C will provide reactive power to support a startup, controller 150 similarly identifies that switches 144A, 144B, and 144C will need to be closed to allow current to flow from the capacitor banks into the motor starter system.

Controller 150 may be programmed to send signals to motor starter systems 126A and 126B indicating that reactive power system 140 is available to provide reactive power to activate motor starter systems. After receiving a signal from one of motor starter systems 126A or 126B indicating a startup procedure is requested, controller 150 may discontinue sending signals to motor starter systems 126A and 126B indicating reactive power system 140 is available. After completing the process of providing reactive power to start a motor starter system, controller 150 may restart sending signals that it is once again available to provide reactive power.

Controller 150 sends signals over communication network 160 to the designated one of motor starter systems 126A or 126B to begin its start process. Likewise, controller 150 sends signals requesting closure to the one or more switches (144A, 144B, and/or 144C) corresponding to the capacitor banks (146A, 146B, and/or 146C) that are identified to provide current to support startup of the motor starter system. The signals are synchronized so that the switches (144A, 144B, and/or 144C) close and thereby allow current to flow from capacitor banks (146A, 146B, and/or 146C) at the appropriate time to meet the demands of the motor starter system (126A or 126B) that is being started.

The switches (144A, 144B, and 144C) may be programmed to generate and communicate a confirming signal that the switch has closed in response to the close signals communicated by the controller 150. Motor starter systems 126A and 126B may also be programmed to communicate a confirming signal that a startup process has begun in response to a signal communicated by controller 150 to the motor system.

Controller 150 may be programmed to monitor for signals from the motor starter system 126A or 126B that is undergoing startup. Controller 150 may further be programmed to monitor the voltage on power bus 124. For example, controller 150 may receive voltage readings from device 148 which may be operable to measure voltage on power bus 124. Controller 150 may receive a signal indicating the motor associate with the motor starter system is coming up to speed or is at or near operational speed. Upon determining the voltage on the power bus has met a threshold value (e.g., 97 percent of operational voltage), controller 150 sequentially communicates to each of the switches to open. The communications are sequenced so that the current from the multiple capacitors are not discontinued simultaneously, which may result in a voltage sag. For example, controller 150 may communicate a signal to a first of the switches 144A to open and thereby interrupt current being generated from the corresponding capacitor 146A from being applied to power bus 124. Controller 150 may communicate signals to a second of the switches (144B) so that the second switch opens after a 5-cycle alternating current interval from opening of the first switch (144A). Controller 150 may communicate signals to other switches so that the switches open after defined numbers of cycles after the last switch opening.

Controller 150 may be programmed to monitor for a malfunction during a startup process. For example, controller 150 may be programmed to monitor for receipt of confirming signals from switches 144A, 144B, and 144C and motor starter systems 126A and 126B. Controller 150 may be programmed to determine if a signal confirming closure is received from the selected one or more of the switches 144A, 144B, and 144C. Controller 150 may likewise be programmed to determine if a confirmation signal is received from the one of motor starter systems 126A and 126B that is being started.

Controller 150 may be programmed to determine if the confirmation signals are received within a prescribed period from issuing of the signals to the switches and motor system. A failure to receive confirming signals within a prescribed period may be an indication that there has been a possible malfunction in the operation of the system and/or the startup process. Controller 150 may be programmed, upon determining that confirmation of closure has not been received from the motor starter system 126A or 126B and/or the selected one or more of electrical switches 142A, 142B, and 142C, within a defined time, to communicate one or more signals to the motor starter system 126A or 126B to cease startup, and to communicate one or more signals to the one or more of electrical switches 142A, 142B, and 142C to open.

Figure 2:
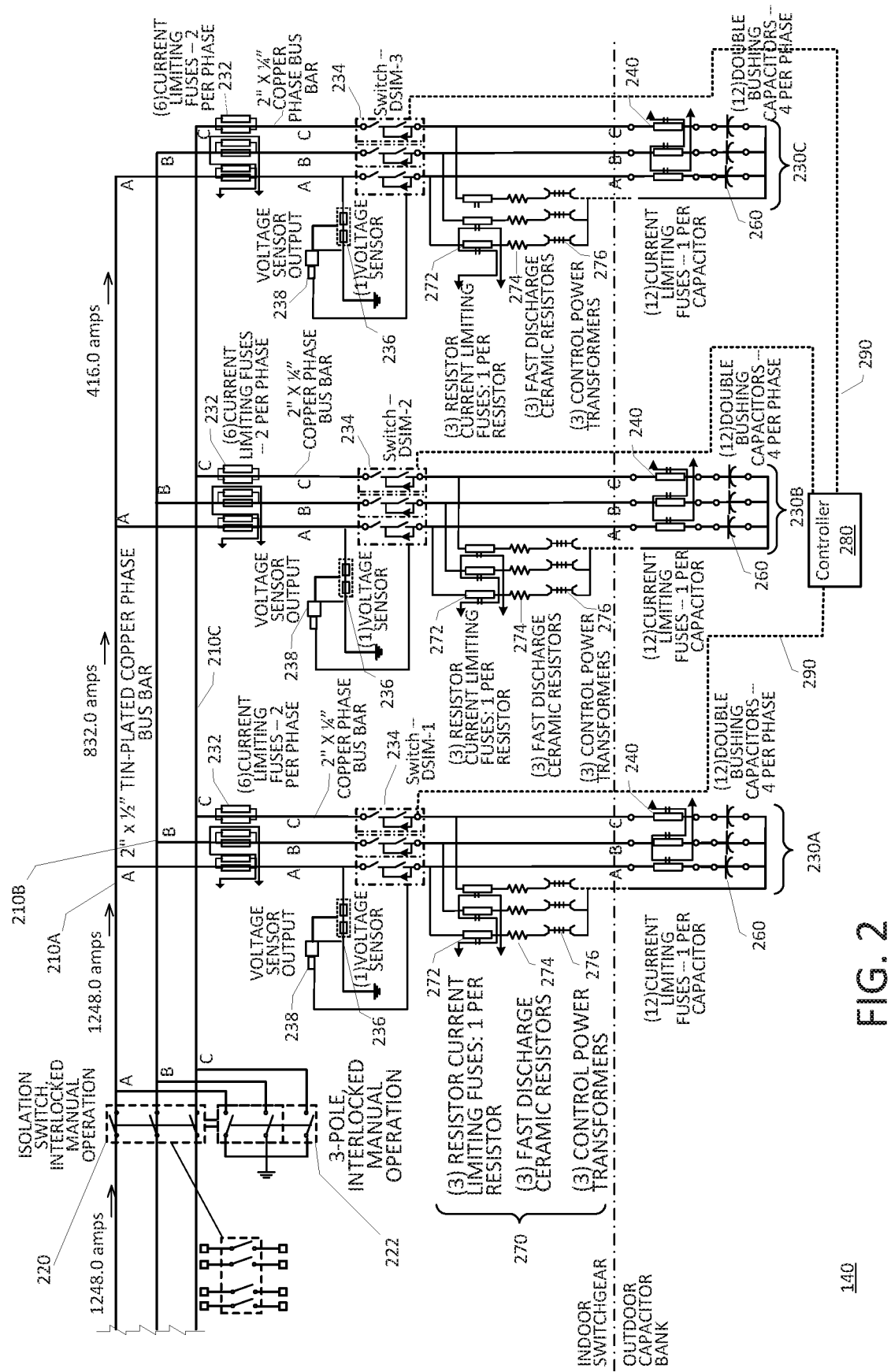
FIG. 2 depicts an example system adapted to provide reactive power.

FIG. 2 provides an isolated view of an example reactive power system 140. As shown, example system 140 may comprise a power bus comprising three power bus lines 210A, 210B, and 210C which may be used to electrically couple reactive power system 140 to other electrical equipment, such as, for example, to motor starter systems 126A and 26B (not shown). In an example scenario, power may be transmitted within reactive power system 140 and user system 120 in multiple phases. In the example of FIG. 2, power may be transmitted in three phases, with each of power buses 210A, 210B, and 210C transmitting a different phase of power.

Reactive power system 140 may comprise electrical isolation switch 220 which is adapted to electrically isolate reactive power system 140 from systems with which it may be interconnected. When electrical isolation switch 220 is open, electricity does not flow into or out of reactive power system 140. Reactive power system 140 may further comprise a ground switch 222 adapted to connect to, and to disconnect from electrical ground. Opening electrical isolation switch 220 and closing ground switch 222 removes reactive power system 140 from a circuit and allows for safe entry and maintenance of reactive power system 240. Opening switch 222 and closing switch 224 electrically connects reactive power system 140 to a circuit. Electrical isolation switch 220 and ground switch 222 may be any suitable switch for providing electrical isolation such as, for example, switches provided by ABB.

Reactive power system 140 may comprise a plurality of electrical stages 230A, 230B, and 230C. Each of the plurality of electrical stages 230A, 230B, and 230C is electrically attached to power bus lines 210A, 210B, and 210C. Each of the electrical stages is adapted to provide reactive power to power via bus lines 210A, 210B, and 210C. Stages 230A, 230B, and 230C are connected in parallel with each other relative to bus lines 210A, 210B, and 210C.

In the example depicted in FIG. 2, each of stages 230A, 230B, and 230C comprises substantially similar components arranged in substantially similar manner. Each of stages 230A, 230B, and 230C may comprise a plurality of current limiting fuses 232, with at least one of current limiting fuses 232 attached to each of the power bus lines 210A, 210B, and 210C. Current limiting fuses 232 operate to protect the subsequent electrical components of the stage (230A, 230B, or 230C) from damaging electrical surges and to allow for electrically disconnecting a failed sage from power bus 210 so as to allow for continued operation of the remainder of the system. In an example, one, two, or three fuses may be applied to each of the power bus lines 210A, 210B, and 210C.

Each of stages 230A, 230B, and 230C comprise an electrical switch 234 electrically connected in series between current limiting fuses 232 and capacitors 260. Switch 234 is adapted to control the flow of current into and from subsequent elements in the stage including capacitors 260. As shown, switch 234 may be adapted to switch each of the multiple power buses, each carrying a different phase of power. Switch 234 may be any electric switch that is suitable to operate in the manner described herein. In an example, switch 234 may be an electrical switch such as a DS1M switch provided by ABB which may be modified for this particular implementation.

Voltage sensor 236 is electrically coupled to one or more of the electrical buses between current limiting fuses 232 and switch 234. Voltage sensor 236 is adapted to measure the voltage into switch 234. Voltage sensor output 238 may communicate the voltage reading to switch 234 and controller 280. Controller 280 may employ voltage readings from each of stages 230A, 230B, and 230C to manage operation of switches 234A, 234B, and 234C.

Switch 234 is communicatively coupled with controller 280. Switch 280 is adapted to receive signals from controller 280 and, in response thereto, to either close or open and thereby either allow or disallow electrical current to flow from capacitors 250.

Current limiting fuses 240 are electrically positioned in series between switch 234 and capacitors 260. Current limiting fuses 240 are adapted operate for capacitor failure and to protect capacitors 260 from case rupture. Current limiting fuses may be positioned on each of the power buses carrying different phases of power. Any suitable number and combination of fuses may be employed.

One or more capacitors 260, which together may be said to form a capacitor bank, are attached in series with current limiting fuses 240 and switch 234. At least one capacitor 260 is electrically attached to each of the three power buses. In an example, each capacitor 260 on each power line may comprise four capacitor devices. Capacitors 260 are electrically connected to conduct current upon closing of switch 234. Capacitors 260 may be sized to provide sufficient reactive power (current) upon switching of switch 234 to address the needs of equipment such as, for example, motor starter systems 126A and 126B which may be attached to reactive power system 140. Capacitors 260 may be any that are suitable to operate as described herein. In an example, capacitors 260 may comprise one or more double bushing capacitors.

A discharge circuit 270 may be electrically connected in parallel with each of capacitors 260 on each of the power buses. Each discharge circuit 270 is electrically coupled to one of the three power buses and is adapted to discharge the corresponding electrically connected capacitor 260. In an example scenario, switch 234 may have been closed and capacitors 260 may have generated current that is transmitted from capacitors 260 through switch 234 to power buses 210A, 210B, and 210C and electric motor starter system 126A. Upon electric motor starter system 126A reaching an operating state, controller 280 may communicate a signal to open to switch 234. When switch 234 opens, current from each capacitor 260 runs into the corresponding discharge circuit 270 which dissipates the current and the remaining charge on the corresponding capacitor 260.

In an example, discharge circuit 270 may comprise a current limiting fuse 272, fast discharge resistor 274, and control power transformer 276 positioned in series between the positive anode of the capacitor and the negative anode. Current limiting fuse 272 is adapted to interrupt the circuit if current through the fuse exceeds a desired value. Fuse 272 protects fast discharge resistor 274 and control power transformer 276 from excessive current. Fast discharge resistor 274 provides electrical resistance and is adapted and sized to slow the current prior to entry into control power transformer 276. In an example, fast discharge resistor 274 may be a 200 Ohm, 300-Watt ceramic resistor. Control power transformer 276 operates to dissipate the current applied to it. In an example, control power transformer 276 may be adapted for an average voltage of 4.16 KV, have a power rating of 5KVA, and a Basic Insulation level (BIL) of 60 KV.

Discharge circuit 270 speeds the discharge of the connected capacitors 260. Once the capacitors 260 have been discharged, the reactive power system 140 may be used to provide reactive power to another reactive power system 240. For example, after capacitors in stage 230A and 230B provide current to start motor starter system 120A, switches 234 are opened and remaining charge on capacitors 260 is discharged through discharge circuit 270. Once capacitors 260 of stages 230A and 230B have been discharged, the capacitors may be used to provide current to start motor starter system 120B or other devices. Accordingly, by providing an enhanced rate of discharge, discharge circuit 270 allows for more frequent reuse of reactive power system 140.

In the example of FIG. 2, each of stages 230A, 230B, and 230C comprise the same components arranged in the same manner. It will be appreciated that in other examples, the components and arrangement of those components may differ as between stages 230A, 230B, and 230 C. Further, it will be appreciated that while three stages are illustrated, any number of stages and corresponding switches and capacitors may be employed.

Controller 280 may be a programmable device with computing memory and logic and may be programmed to control the opening and closing of switches 234 to provide the appropriate current from capacitors 260 during startup of motor systems 126A and 126B. Controller 280 may be communicatively coupled with various components in reactive power system 240 and with systems outside of reactive power system 240. In the example of FIG. 2, controller 280 may be communicatively coupled with switches 234 in each of stages 230A, 230B, and 230C. Controller 280 may further be communicatively coupled with motor systems 126A and 126B located external to reactive power system 140. Controller may be programmed to communicate signals to motor systems 126A and 126B and switches 234 so that current is supplied by capacitors 260 during startup of motor systems 126A and 126B. Controller 280 may be communicatively coupled to the various system components using any suitable communication technology such as, for example, fiber optics and real time communication protocols.

Figure 3:
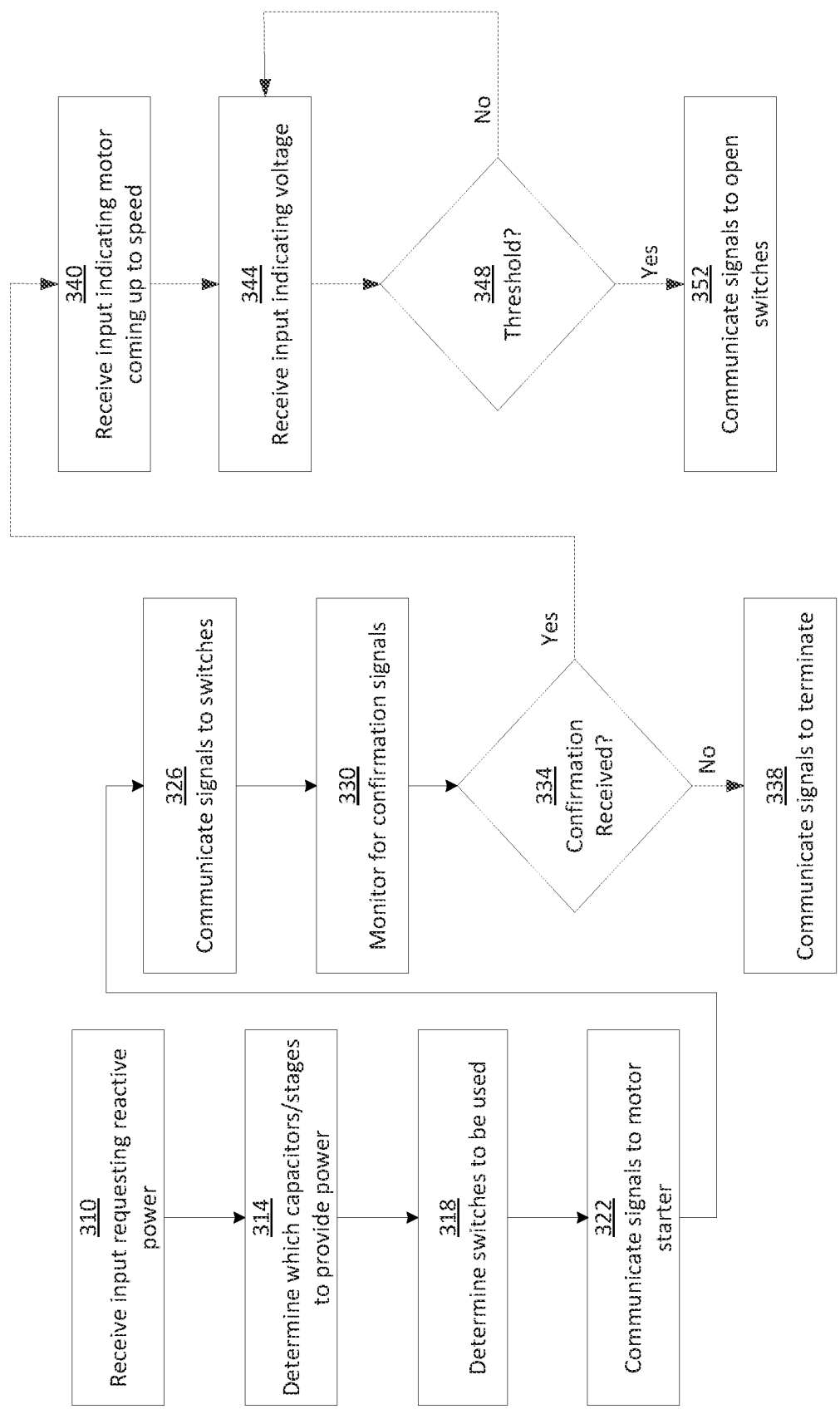
FIG. 3 depicts example processing for providing reactive power.

FIG. 3 depicts example processing performed by controller 280. At 310, controller 280 may receive inputs indicating a system in user system 120 may require reactive power to be applied. In an example, controller 280 may receive an input from one of motor starter systems 126A and 126B indicating the system is to be started. Starting either of motor starter systems 126A or 126B typically requires an increased current into the motor system. Controller 280 controls reactive power system 140 to provide current at the appropriate time.

Upon receiving a signal indicating one of motor systems 126A and 126B is to start, at 314, controller 280 determines which of stages 230A, 230B, and 230C including capacitors 260 should be applied to provide reactive power for starting the motor system. For example, controller 280 may have previously been programmed to select at 314, capacitors 260 located in stages 230A, 230B, and 230C to be applied when motor system 126A is being started. By way of further example, controller 280 may have previously been programmed to select capacitors 260 in stages 230B and 230C to be applied when motor system 126B is being started. The number and types of capacitors selected for a motor system may depend upon the amount of current anticipated to be used in starting a motor system.

At 318, controller 280 may determine the switches 234 that are in the identified stages (230A, 230B, and/or 230C) for the desired capacitors. For example, in a scenario wherein controller 280 determines each of capacitors in stages 230A, 230B, and 230C should provide current to support a startup, controller 280 similarly determines that switches 234 in those stages 230A, 230B, and 230C should be closed to allow current to flow from the capacitor banks into the motor.

Referring to FIG. 3, at 322, controller 280 generates and transmits signals over communication network 290 to the one of motor systems 126A or 126B from which a signal was received indicating an intention to begin its start process. The transmitted signals may indicate that the particular one of motor systems 126A and 126B may begin its startup process. In an example scenario wherein a signal had previously been received from motor system 126A, at 322, controller 280 may generate and transmit signals to motor system 126A indicating to begin its startup process.

At 326, controller 280 sends signals that request closure of the particular one or more switches 234 corresponding to the identified stages (230A, B, and/or C) that were identified to provide current to support startup of the motor system. Controller 280 synchronizes the communication of the signals to the motor system (at 322) and the switches (at 326) so that the switches close at the appropriate time to allow current to flow from capacitors 260 to meet the demands of the particular motor (126A or 126B) that is being started.

Switches 234 may be programmed to generate and communicate a confirming signal that the switch has closed in response to the close signals communicated by the controller 280. Motor systems 126A and 126B may also be programmed to communicate a confirming signal that a startup process has begun in response to a signal communicated by controller 280 to the motor system.

At 330, controller 280 monitors for receipt of confirming signals from switches 234 and motor systems 126A and 126B. For example, controller 280 may be programmed to monitor for receipt of one or more signals indicating switches 234 have closed and receipt of one or more signals indicating a particular one of motor systems 126A and 126B has begun starting.

At 334, controller 280 determines if the confirmation signals have been received and determines if they have been received within a prescribed length of time from the controller 280 having issued the signals to the switches and motor system. A failure to receive confirming signals within a prescribed period of time may be an indication that there has been a possible malfunction in the operation of the system and/or the startup process.

If controller 280 determines that confirmation of closure has not been received from the motor starter system within a defined time, and/or determines that confirmation has not been received from the electrical switch 234 in the designated electrical stages within the defined time, at 338, controller 280 communicates signals to terminate the process. For example, controller 280 may communicate one or more signals to the particular one of motor starter systems 126A and 126B to cease startup. Likewise, controller 280 may communicate signals to open to the particular switches 234 that it had previously signaled to close.

If at 334, controller 280 determines confirmation signals have been received in a timely manner, at block 340, controller 150 monitors for further signals from the particular motor starter system 126A or 126B that is undergoing startup. Controller 150 may receive a signal indicating the motor associated with the motor starter system is coming up to speed or is at or near operational speed.

At 344, controller 280 may monitor the voltage on power bus 124. For example, controller 150 may receive voltage readings from voltage sensor 236 which may be operable to measure voltage on the power bus, or separate bus potential transformers may be used to provide the same function.

At 348, controller 280 determines whether the voltage on the power bus has met a threshold value. For example, controller 280 may determine whether the voltage is 97 percent of a full operational value. If controller 280 determines that the voltage has met a threshold value, at 352, controller 280 sequentially communicates to each of the switches to open. The communications are sequenced so that the current from the multiple capacitors are not discontinued simultaneously, which may result in a voltage sag. For example, controller 150 may communicate a signal to a first of the switches 234 to open and thereby interrupt current being generated from the corresponding capacitor. Controller 150 may communicate signals to a second of the switches so that the second switch opens after a 5-cycle alternating current interval from opening of the first switch. Controller 150 may communicate signals to any remaining switches so that the switches open after defined numbers of cycles subsequent to the last switch opening.

Figure 4:
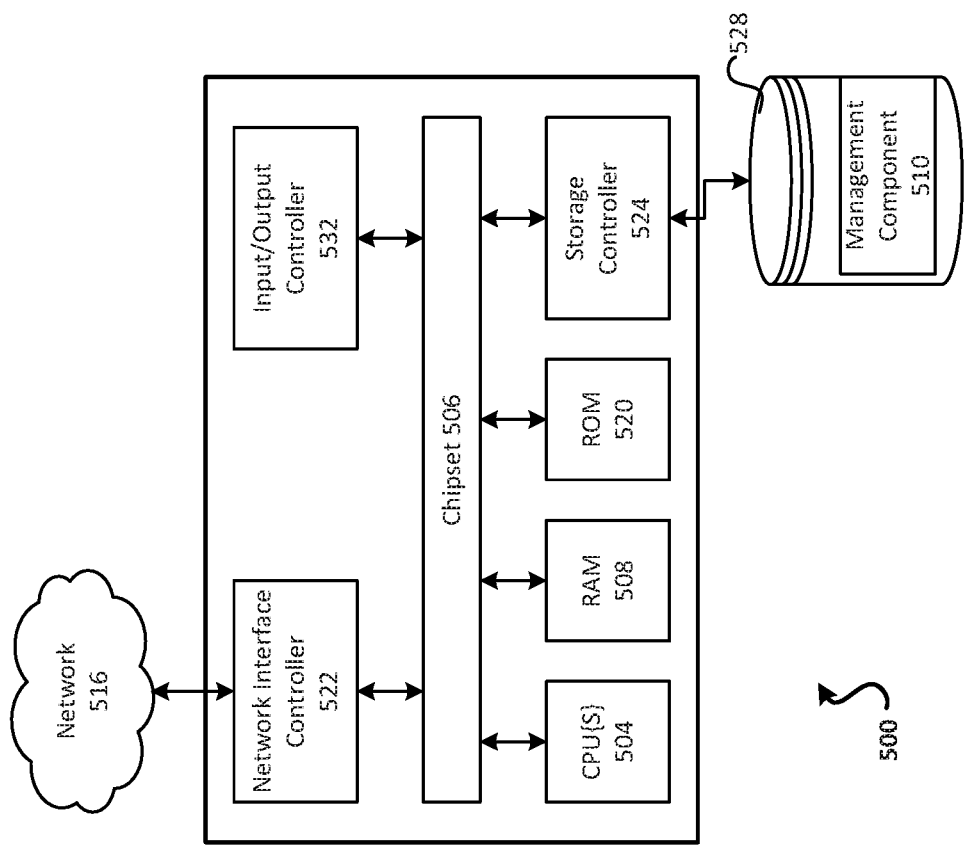
FIG. 4 depicts an example computing system architecture.

Controller 280 may be any programmable computing system that is suitable for providing the processing as described herein. FIG. 4 depicts an example architecture for a computing system 400 capable of executing software for performing operations as described above in connection with FIGS. 1-3. The computer architecture may be used in any computing node and may be utilized to execute any aspects of the processing presented herein.

Computing system 400 may include a baseboard, or "motherboard," which is a printed circuit board to which a multitude of components or devices may be connected by way of a system bus or other electrical communication paths. One or more central processing units (CPUs) 504 may operate in conjunction with a chipset 506. CPUs 504 may be standard programmable processors that perform arithmetic and logical operations necessary for the operation of computer 500.

CPUs 504 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

Chipset 506 may provide an interface between CPUs 504 and the remainder of the components and devices on the baseboard. Chipset 506 may provide an interface to a random-access memory (RAM) 508 used as the main memory in computer 500. Chipset 506 may further provide an interface to a computer-readable storage medium, such as a read-only memory (ROM) 520 or non-volatile RAM (NVRAM) (not shown), for storing basic routines that may help to start up computing system 500 and to transfer information between the various components and devices. ROM 520 or NVRAM may also store other software components necessary for the operation of computing system 500 in accordance with the embodiments described herein.

Computing system 500 may operate in a networked environment using logical connections to remote computing nodes and computer systems through network 516. Chipset 506 may include functionality for providing network connectivity through a network interface controller (NIC) 522, such as a gigabit Ethernet adapter. NIC 522 may be capable of connecting the computing system 500 to other computing nodes over network 516. It should be appreciated that multiple NICs 522 may be present in computer 500, connecting the computing system to other types of networks and remote computer systems.

Computing system 500 may be connected to a storage device 528 that provides non-volatile storage for the computing system. Storage device 528 may store system programs, application programs, other program modules, and data, which have been described in greater detail herein. Storage device 528 may be connected to computing system 500 through a storage controller 524 connected to chipset 506. Storage device 528 may consist of one or more physical storage units. Storage controller 524 may interface with the physical storage units through a serial attached SCSI (SAS) interface, a serial advanced technology attachment (SATA) interface, a fiber channel (FC) interface, or other type of interface for physically connecting and transferring data between computers and physical storage units.

Computer 500 may also include an input/output controller 532 for receiving and processing input from a number of input devices, such as a keyboard, a touchpad, a touch screen, an electronic stylus, or other type of input device. Similarly, input/output controller 532 may provide output to a display, such as a computer monitor, a flat-panel display, a digital projector, a printer, a plotter, or other type of output device. It will be appreciated that computing system 500 may not include all of the components shown in FIG. 4, may include other components that are not explicitly shown in FIG. 4, or may utilize an architecture completely different than that shown in FIG. 4.

Accordingly, Applicant has disclosed a reactive power system for providing reactive power on demand to an electrical system such as, for example, an induction motor. A system may comprise a plurality of electrical capacitor banks, with each electrical capacitor bank electrically connected in series with an electrical switch. The electrical switches are electrically connected to an electrical induction motor system. The system may comprise a controller communicatively coupled with the electrical induction motor and each of the electrical switches. The controller, in response to receiving a signal or communication from the electrical induction motor system, determines which of the plurality of electrical capacitors from which electrical power should be provided for the electrical induction motor system. For the determined or identified electrical capacitor(s), the controller identifies the corresponding electrical switch(es) and communicates a signal to close the switch (es). Closing the switches results in the capacitors becoming electrically connected to the electrical induction motor system and provide current to the electrical induction motor system.

It will be appreciated that while the reactive power system has been described in the context of example embodiments depicted in the figures, the potential embodiments are not limited to those depicted. For example, while the figures depict a reactive power system providing current to start a motor system, a reactive power system consistent with the application may be employed to provide current to other types of electrical systems. Further, while the reactive power system has been described with a particular configuration of capacitors, switches, and other components, other configurations may be employed. Modifications may be made to the reactive power system and to its integration with systems requiring reactive power.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

The foregoing description is provided for the purpose of explanation and is not to be construed as limiting the potential embodiments. While the embodiments have been described with reference to preferred embodiments or preferred methods, it is understood that the words which have been used herein are words of description and illustration, rather than words of limitation. Furthermore, although the invention has been described herein with reference to particular structure, methods, and embodiments, the potential embodiments are not intended to be limited to the particulars disclosed herein, as the potential embodiments extend to all structures, methods and uses that are within the scope of the appended claims. Further, to the degree that advantages have been described that flow from the structure and methods; the potential embodiments are not limited to structure and methods that encompass any or all of these advantages. Those skilled in the relevant art, having the benefit of the teachings of this specification, may affect numerous modifications to the potential embodiments as described herein, and changes can be made without departing from the scope and spirit of the potential embodiments as defined by the appended claims. Furthermore, any features of one described embodiment can be applicable to the other embodiments described herein.

What is claimed is:

1. A system, comprising:
   a first stage comprising a first electrical contact adapted to interface with a power bus, a first electrical switch electrically connected with the first electrical contact, and a first electrical capacitor electrically coupled in series with the a first electrical switch, the first electrical capacitor adapted to discharge electric current through the first switch to the first electrical contact upon the first electrical switch being closed;
   a second stage comprising a second electrical contact adapted to interface with the power bus, a second electrical switch electrically connected with the second electrical contact, and a second electrical capacitor electrically coupled in series with the second electrical switch, the second electrical capacitor adapted to discharge electric current through the second switch to the second electrical contact upon the second electrical switch being closed;
   a third stage comprising a third electrical contact adapted to interface with the power bus, a third electrical switch electrically connected with the third electrical contact, and a third electrical capacitor electrically coupled in series with the third electrical switch, the third electrical capacitor adapted to discharge electric current through the third switch to the third electrical contact upon the third electrical switch being closed; and
   a controller programmed to perform operations comprising:
      receiving an input from a first motor starter system electrically coupled to the power bus, the first motor starter system being one of a plurality of motor starter systems electrically coupled to the power bus;
      selecting, based on receiving input from the first motor starter system in the plurality of motor starter systems, to close two or more of the first electrical switch, the second electrical switch, and the third electrical switch;
      communicating to the selected two or more of the first electrical switch, the second electrical switch, and the third electrical switch to close;
      determining if confirmation of closure is received from the selected two or more of the first electrical switch, the second electrical switch, and the third electrical switch;
      determining if confirmation is received from the first motor starter system; and
      upon determining confirmation is not received from the first motor starter system and from the selected two or more of the first electrical switch, the second electrical switch, and the third electrical switch, communicating to the first motor starter system to terminate and communicating to the selected two or more of the first electrical switch, the second electrical switch, and the third electrical switch to open.

2. The system of claim 1, wherein determining confirmation is not received from the first motor starter system and from the selected two or more of the first electrical switch, the second electrical switch, and the third electrical switch comprises determining confirmation is not received from the first motor starter system and from the selected two or more of the first electrical switch, the second electrical switch, and the third electrical switch within a defined period of time.

3. The system of claim 1, wherein receiving an input from the first motor starter system comprises receiving information identifying the first motor starter system is prepared to perform a start procedure.

4. The system of claim 1, wherein the controller is programmed to perform further operations comprising:
   monitoring voltage on the power bus;
   receiving a signal indicating a motor associated with the first motor starter system is coming up to speed; and
   upon determining a value associated with the voltage on the power bus has met a threshold, sequentially communicating to each of the selected two or more of the first electrical switch, the second electrical switch, and the third electrical switch.

5. The system of claim 4, wherein sequentially communicating to each of the selected two or more of the first electrical switch, the second electrical switch, and the third electrical switch to open comprises:
   communicating a signal to open to a first of the selected two or more of the first electrical switch, the second electrical switch, and the third electrical switch; and
   communicating a signal to open at a five-cycle interval to a second of the selected two or more of the first electrical switch, the second electrical switch, and the third electrical switch.

6. The system of claim 1, wherein the controller is programmed to perform further operations comprising:
   determining to discontinue a signal permitting activation of motor starter systems after receiving an input from a motor starter system electrically coupled to a power distribution system indicating a startup procedure is requested.

7. The system of claim 1,
   wherein the first stage comprises a discharge circuit, the discharge circuit comprising a resistor in series with a control power transformer, the resistor electrically coupled between the first electrical switch and the control power transformer, the control power transformer electrically coupled between the resistor and a terminal of the first electrical capacitor.

8. The system of claim 7, wherein electric current received at the resistor is dissipated across the resistor and the control power transformer.

9. The system of claim 7,
   wherein the second stage comprises a discharge circuit electrically connected in parallel with the second electrical capacitor; and
   wherein the third stage comprise a discharge circuit electrically connected in parallel with the third electrical capacitor.

10. A system, comprising:
a first stage comprising a first electrical switch electrically connected with a power bus, and a first electrical capacitor electrically coupled in series with the first electrical switch, the first electrical capacitor adapted to discharge electric current through the first electrical switch to the power bus upon the first electrical switch being closed;
a second stage comprising a second electrical switch electrically connected with the power bus, and a second electrical capacitor electrically coupled in series with the second electrical switch, the second electrical capacitor adapted to discharge electric current through the second electrical switch to the power bus upon the second electrical switch being closed; and
a controller programmed to perform operations comprising:
receiving an input from a first motor starter system electrically coupled to the power bus, the first motor starter system being one of a plurality of motor starter systems electrically coupled to the power bus;
selecting, based on receiving input from the first motor starter system in the plurality of motor starter systems, to close the first electrical switch and the second electrical switch;
communicating to the first electrical switch and the second electrical switch to close;
determining if confirmation of closure is received from the first electrical switch and the second electrical switch;
determining if confirmation is received from the first motor starter system; and
upon determining confirmation is not received from the first motor starter system and from the first electrical switch and the second electrical switch, communicating to the first motor starter system to terminate and communicating to the first electrical switch and the second electrical switch to open.

11. The system of claim 10, wherein the controller is programmed to perform further operations comprising:
monitoring voltage on the power bus;
receiving a signal indicating a motor associated with the first motor starter system is coming up to speed;
upon determining a value associated with the voltage on the power bus has met a threshold, sequentially communicating signals to open to each of the first electrical switch and the second electrical switch.

12. The system of claim 11, wherein sequentially communicating signals to open to each of the first electrical switch and the second electrical switch comprises:
communicating one or more signals to open the first electrical switch and the second electrical switch; and
communicating one or more signals to open at a five-cycle interval to the second electrical switch.

13. The system of claim 10, wherein the controller is programmed to perform further operations comprising:
determining to discontinue a signal permitting activation of motor starter systems after receiving an input from a motor starter system electrically coupled to the power bus indicating a startup procedure is requested.

14. The system of claim 10,
wherein the first stage comprises a first discharge circuit electrically connected in parallel with the first electrical capacitor, the first discharge circuit comprising a first resistor in series with a first control power transformer, the first resistor electrically coupled between the first electrical switch and the first control power transformer, the first control power transformer electrically coupled between the first resistor and a terminal of the first electrical capacitor; and
wherein the second stage comprises a second discharge circuit electrically connected in parallel with the second electrical capacitor, the second discharge circuit comprising a second resistor in series with a second control power transformer, the second resistor electrically coupled between the second electrical switch and the second control power transformer, the second control power transformer electrically coupled between the second resistor and a terminal of the second electrical capacitor.

* * * * *